2 Sheets—Sheet 1.

J. M. READ.

Cooking Stove and Range.

No. 2,076.

Reissued Sept. 26, 1865.

Witnesses
J. L. Wakefield
Frederick Coates

Inventor
Joseph M. Read

N. PETERS, Photo-Lithographer, Washington, D. C.

2 Sheets—Sheet 2.

J. M. READ.

Cooking Stove and Range.

No. 2,076. Reissued Sept. 26, 1865.

WITNESSES.
T. L. Wakefield
Frederick Cantis

INVENTOR
Joseph M. Read

N. PETERS, Photo-Lithographer, Washington, D. C.

UNITED STATES PATENT OFFICE.

JOSIAH M. READ, OF BOSTON, MASSACHUSETTS.

IMPROVEMENT IN COOK-STOVES AND RANGES.

Specification forming part of Letters Patent No. 26,054, dated November 8, 1859; Reissue No. 2,076, dated September 26, 1865.

*To all whom it may concern:*

Be it known that I, JOSIAH M. READ, of Boston, in the county of Suffolk and State of Massachusetts, have invented a certain new and useful Improvement in Stoves, Ranges, &c.; and I do hereby declare the same to be fully described in the following specification and represented in the accompanying drawings, of which—

Figure 3:
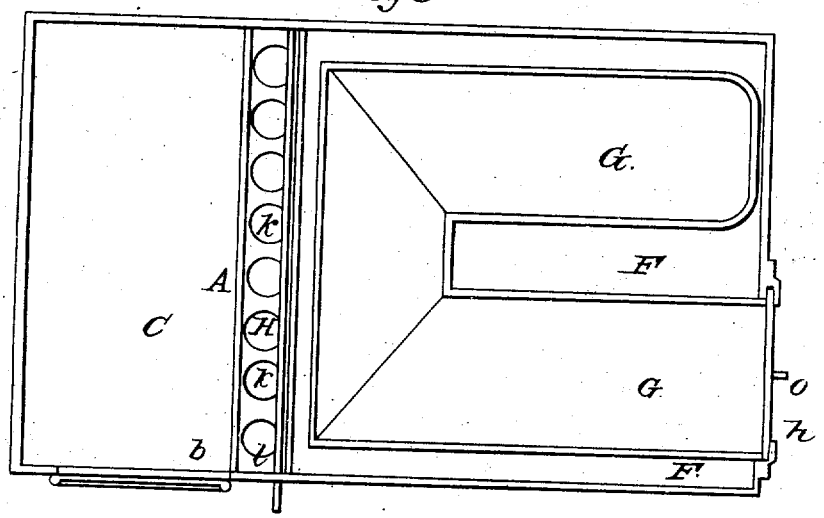
Figure 2:
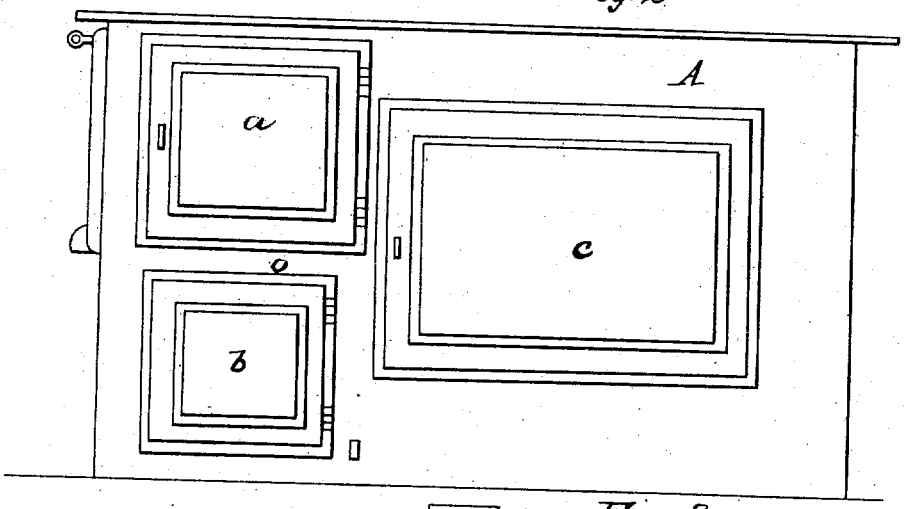
Figure 3:
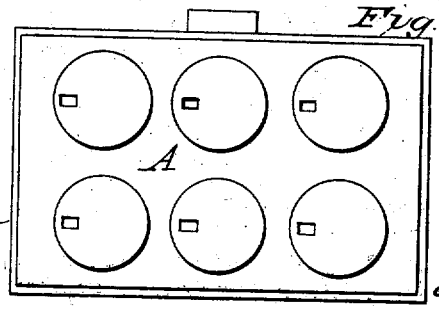
Figure 4:
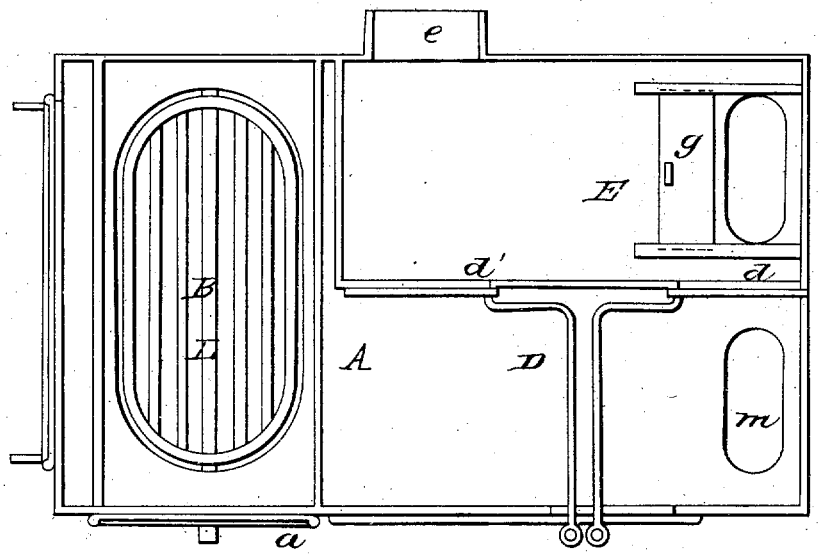
Figure 5:
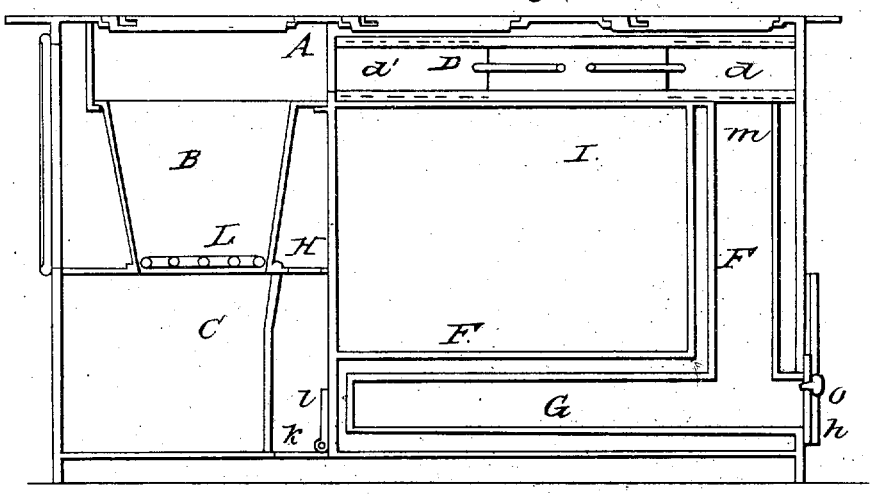

Figure 1 denotes a top view of a cooking-stove containing my invention. Fig. 2 is a side elevation of the same. Fig. 3 is a longitudinal section of it, taken through the flue or heating space under the oven, the same being hereinafter described. Fig. 4 is a horizontal section taken through the two flues over the oven. Fig. 5 is a vertical central and longitudinal section of the stove.

In the drawings, A represents the stove as constructed with a fire-place, B, the same being provided with a grate, L, and an ash-pit, C, in the ordinary manner, and with six holes or recesses for cooking utensils in the top of said stove. *a* is the door for the introduction of fuel to the fire-place. *b* is the door of the ash-pit, and *c* the oven-door.

In the rear part of the stove and over the oven is a chamber, D, communicating with another closed chamber, E, by means of two dampers, *d d'*, the said chamber E having a smoke-discharge flue, *e*, for the escape of the smoke arising from the fire, either in the fire-pot or in the auxiliary fire-space under the oven. The damper *d'* is for the purpose of allowing the smoke and heat from the fire in the fire-place to pass off immediately through the chamber E when a great draft is required. By closing the damper *d'* and opening the damper *d* the heat and smoke are caused to pass off the entire length of the oven, (and thereby heat the same,) and thence to escape through the chamber E and flue *e*.

Extending underneath the oven I and up the rear side of the same and the end of the stove is a recess or chamber, F, the same being for the reception of a bent pipe or auxiliary heating-space, G, which enters the chamber F from the outer atmosphere at the rear part of the stove, and after traversing the oven at right angles, as seen in Fig. 3, extends upward through the chamber E and into the chamber F, and has a damper, *g*, at its entrance thereto, for the purpose of regulating the draft through the flue G. A branch, *m*, of the flue G also extends upward into the chamber D through the chamber F. The flue G at its entrance into the outer atmosphere is provided with a sliding door, *h*, for the purpose of supplying fuel to the same, and for regulating the draft thereof, and is furnished with a clamp-screw, *o*, to hold it in place in any desired position.

In rear of the ash-pit and between it and the oven is an air-space, H, for the purpose of supplying air to the fire by means of air inlets or openings *k k k*, &c., made in the bottom plate of the stove, the said air-space H receiving its supply of air from the cellar of the house or building or any other suitable place, the quantity of air to be admitted thereto being regulated by a damper, *l*, placed over the openings *k k k*. In warm weather, when it is desirable to heat the oven without making a large fire in the usual fire place and heating the room in which the stove may be placed, or when the fire in the fire-place has become low and it is not desirable to renew it, if we introduce a little light fuel into the auxiliary heating-space G through its door *h* and ignite it the oven can be heated in a very short time.

It is obvious that the location of the auxiliary heating-space G may be changed without affecting the character of my invention, and consequently I do not confine myself to the exact location, as above described.

I claim—

The application to a cooking-stove, range, &c., of an auxiliary heating space or flue, substantially in manner and to operate as hereinbefore described.

JOSIAH M. READ.

Witnesses:

T. L. WAKEFIELD,

FREDERICK CURTIS.